(No Model.) 2 Sheets—Sheet 1.
N. TESLA.
APPARATUS FOR PRODUCING ELECTRICAL CURRENTS OF HIGH FREQUENCY.
No. 568,180. Patented Sept. 22, 1896.
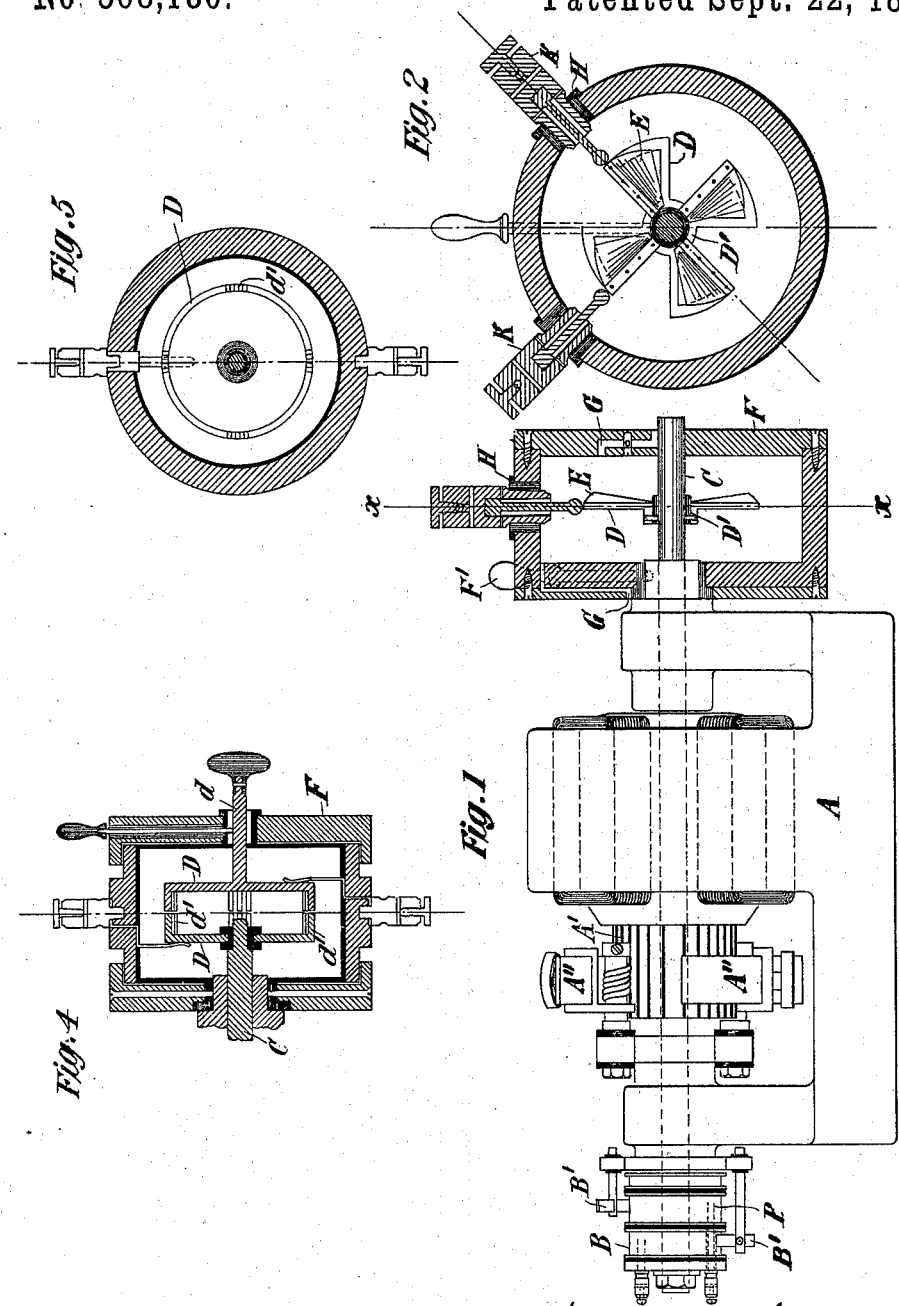
WITNESSES:
Edwin B. Hopkinson
Benjamin [signature]
Nikola Tesla, INVENTOR
BY
Kerr, Curtis Page, ATTORNEYS

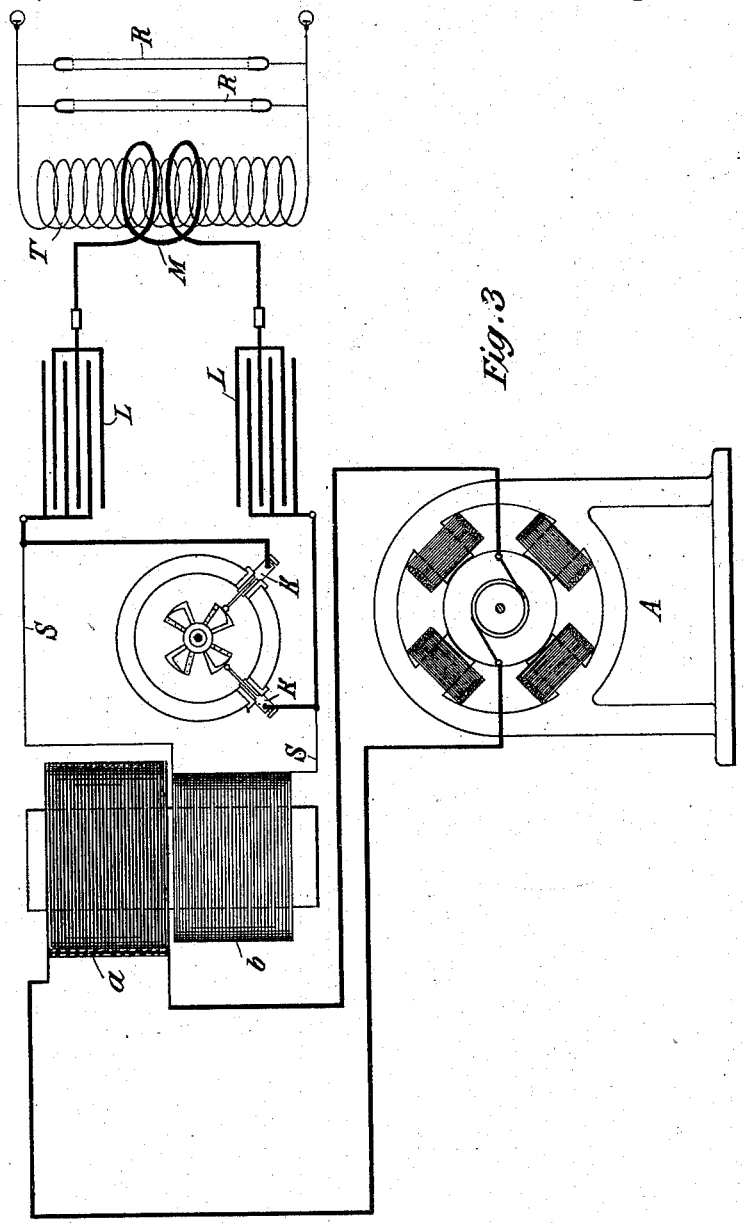

UNITED STATES PATENT OFFICE.

NIKOLA TESLA, OF NEW YORK, N. Y.

APPARATUS FOR PRODUCING ELECTRICAL CURRENTS OF HIGH FREQUENCY.

SPECIFICATION forming part of Letters Patent No. 568,180, dated September 22, 1896.

Application filed July 9, 1896. Serial No. 598,552. (No model.)

*To all whom it may concern:*

Be it known that I, NIKOLA TESLA, a citizen of the United States, residing at New York, in the county and State of New York, have invented certain new and useful Improvements in Apparatus for Producing Electrical Currents of High Frequency, of which the following is a specification, reference being had to the drawings accompanying and forming a part of the same.

This invention is an improvement in apparatus for producing electrical currents of high frequency in accordance with the general plan heretofore invented and practiced by me and based upon the principle of charging a condenser or circuit possessing capacity and discharging the same through a circuit of low self-induction, so that rapid electrical oscillations are obtained. To secure this result, I employ some means for intermittently charging the condenser and for discharging it through the circuit of low self-induction; and among the means which I have heretofore employed for this purpose was a mechanical contact device which controlled both the charging and the discharge circuit in such manner that the condenser was alternately charged by the former and discharged into the latter.

My present improvement consists in an apparatus for effecting the same result by the use of a circuit-controller of special character in which the continuity of the paths for the current is established at intervals by the passage of sparks across a dielectric.

In carrying out my present improvement I employ a circuit-controller containing two terminals or sets of terminals movable with respect to each other into and out of proximity, and I provide means whereby the intervals between the periods of close approximation, during which the spark passes, may be adjusted so that when used in a system supplied by a source of alternating current the periods of make and break may be timed with reference to a phase of the current wave or impulse.

Referring to the drawings, which illustrate in its preferred form the improvement above referred to, Figure 1 is a view, partly in elevation and partly in section, of a generator arranged to give an alternating current with the circuit-controller mounted on its shaft. Fig. 2 is a section of the controller of Fig. 1 on line $xx$ of said figure. Fig. 3 is a diagram illustrating the system or apparatus as a whole. Figs. 4 and 5 are sectional views of a modified form of circuit-controller.

A designates in Fig. 1 a generator having a commutator A' and brushes A'' bearing thereon, and also collecting-rings B B, from which an alternating current is taken by brushes B' in the well-understood manner.

The circuit-controller is mounted in part on an extension of the shaft C of the generator, and in part on the frame of the same, or on a stationary sleeve surrounding the shaft. Its construction in detail is as follows: D is a metal plate with a central hub D', which is keyed or clamped to the shaft C. The plate is formed with segmental extensions corresponding in number to the waves of current which the generator delivers. These segments are preferably cut away, leaving only rims or frames, to one of the radial sides of which are secured bent metal plates E, which serve as vanes to maintain a circulation of air when the device is in operation. The segmental disk and vanes are contained within a close insulated box or case F, mounted on the bearing of the generator, or in any other proper way, but so as to be capable of angular adjustment around the shaft. To facilitate such adjustment, a screw-rod F', provided with a knob or handle, is shown as passing through the wall of the box. The latter may be adjusted by this rod, and when in proper position may be held therein by screwing the rod down into a depression in the sleeve or bearing, as shown in Fig. 1. Air-passages G G are provided at opposite ends of the box, through which air is maintained in circulation by the action of the vanes. Through the sides of the box F and through insulating-gaskets H, when the material of the box is not a sufficiently good insulator, extend metallic terminal plugs K K, with their ends in the plane of the conducting segmental disk D and adjustable radially toward and from the edges of the segments. This or similar devices are employed to carry out the invention above referred to in the manner illustrated in Fig. 3. A in this figure represents any source of alternating current the potential of which is raised by a transformer, of which $a$ is the primary and $b$ the secondary. The ends of the secondary circuit S are connected to the terminal plugs K K of an apparatus similar to that of Figs. 1 and 2 and having segments rotating in synchronism with the alternations of the current source, preferably, as above described, by being mounted on the shaft of the generator when the conditions so permit. The plugs K K are then adjusted radially, so as to approach more or less the path of the outer edges of the segmental disk, and so that during the passage of each segment in front of a plug a spark will pass between them, which completes the secondary circuit S. The box or the support for the plugs K is adjusted angularly, so as to bring the plugs and segments into proximity at the desired instants with reference to any phase of the current-wave in the secondary circuit and fixed in position in any proper manner. To the plugs K K are also connected the terminals of a condenser or condensers L, so that at the instant of the rupture of the secondary circuit S by the cessation of the sparks the energy accumulated in such circuit will rush into and charge the condenser. A path of low self-induction and resistance, including a primary M of a few turns, is provided to receive the discharge of the condenser, when the circuit S is again completed by the passage of sparks, the discharge being manifested as a succession of extremely rapid impulses. The potential of these impulses may be raised by a secondary T, which constitutes the source of current for the working circuit or that containing the devices R for utilizing the current.

By means of this apparatus effects of a novel and useful character are obtainable, but to still further increase the efficiency of the discharge or working current I have in some instances provided a means for further breaking up the individual sparks themselves. A device for this purpose is shown in Figs. 4 and 5. The box or case F in these figures is fixedly secured to the frame or bearing of the generator or motor which rotates the circuit-controller in synchronism with the alternating source. Within said box is a disk D, fixed to the shaft C, with projections $d'$ extending from its edge parallel with the axis of the shaft. A similar disk D'' on a spindle $d$, in face of the first, is mounted in a bearing in the end of the box F with a capability of rotary adjustment. The ends of the projections $d'$ are deeply serrated or several pins or narrow projections placed side by side, as shown in Fig. 4, so that as those of the opposite disks pass each other a rapid succession of sparks will pass from the projections of one disk to those of the other.

What I claim as my invention is—

1. The combination with a source of current, of a condenser adapted to be charged thereby, a circuit into which the condenser discharges in a series of rapid impulses, and a circuit-controller for effecting the charging and discharge of said condenser, composed of conductors movable into and out of proximity with each other, whereby a spark may be maintained between them and the circuit closed thereby during determined intervals, as set forth.

2. The combination with a source of alternating current, of a condenser adapted to be charged thereby, a circuit into which the condenser discharges in a series of rapid impulses, and a circuit-controller for effecting the charging and discharge of said condenser, composed of conductors movable into and out of proximity with each other in synchronism with the alternations of the source, as set forth.

3. A circuit-controller for systems of the kind described, comprising in combination a pair of angularly-adjustable terminals and two or more rotating conductors mounted to pass in proximity to the said terminals, as set forth.

4. A circuit-controller for systems of the kind described, comprising in combination two sets of conductors, one capable of rotation and the other of angular adjustment whereby they may be brought into and out of proximity to each other, at determinate points, and one or both being subdivided so as to present a group of conducting-points, as set forth.

NIKOLA TESLA.

Witnesses:
M. LAWSON DYER,
DRURY W. COOPER.